2 Sheets—Sheet 1.

G. LEHBERGER.

WIRE FENCE.

No. 11,445. Reissued Oct. 9, 1894.

Witnesses:
Herbert Bradley.
F. W. Ritter Jr.

Inventor:
George Lehberger.
By
W. H. Singleton.
Atty.

G. LEHBERGER.

WIRE FENCE.

No. 11,445. Reissued Oct. 9, 1894.

Witnesses:
Herbert Bradley
F. W. Ritter Jr

Inventor
George Lehberger.
By W. H. Singleton,
Atty.

UNITED STATES PATENT OFFICE.

GEORGE LEHBERGER, OF NEWBURG, NEW YORK.

WIRE FENCE.

SPECIFICATION forming part of Reissued Letters Patent No. 11,445, dated October 9, 1894.

Original No. 497,523, dated May 16, 1893. Application for reissue filed August 24, 1894. Serial No. 521,253.

*To all whom it may concern:*

Be it known that I, GEORGE LEHBERGER, of Newburg, in the county of Orange and State of New York, have invented certain new and useful Improvements in Wire Fences; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
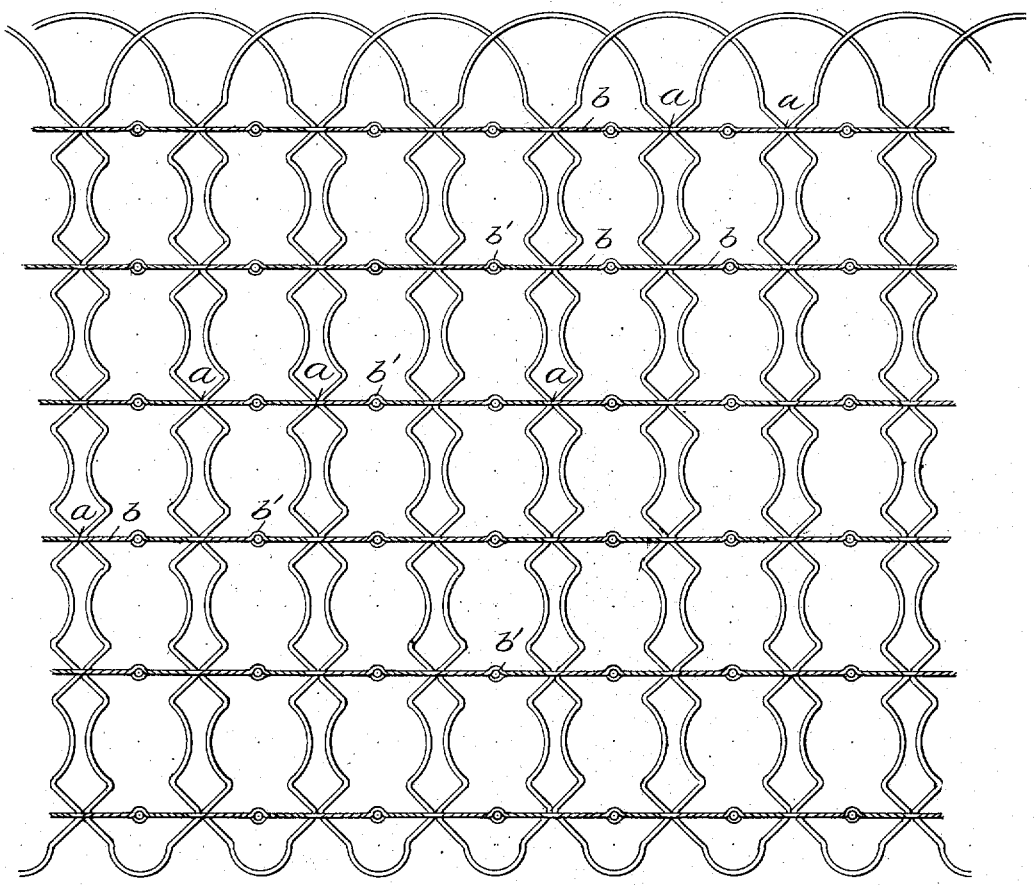
Figure 2:
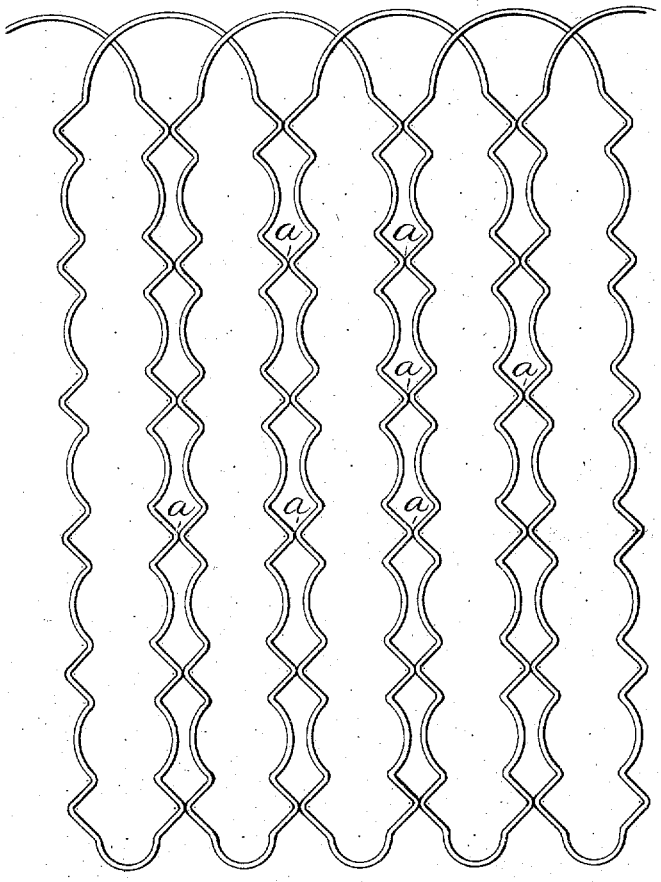

Figure 1 shows in side elevation a section of wire fencing constructed in accordance with my invention. Fig. 2 is a similar view, showing the fencing without the strands, *b*, thus illustrating the construction of the fencing.

My improvement comprises wire fencing composed of a continuous line of wire, or one or more continuous lines of wire extending vertically in loops, in combination with horizontal strands binding the loops together and strengthening the fence.

It also consists in fencing of a continuous line of wire made in vertical loops, each loop having a strand crossing the next loop at the end, but the bodies of the loops being laterally distinct, *i. e.*, not substantially crossing the next except at the end.

My invention affords a wire fence of very strong and durable nature, and easily made by machinery or by hand labor.

As will be seen from the drawings, the fence is composed of a single line of wire arranged in vertical loops of parallel branches, bent so that one side of each loop shall touch or approach at intervals the side of the next adjacent loop The form shown in the drawings is ornamental, but may be varied within the scope of my invention as defined in the claims. At the meeting points, *a*, the loops are bound together by strands, *b*, composed of two or more wires twisted together between the points, *a*, and thus binding the fence into a strong integral structure. The twisting of the strands, *b*, is preferably a right and left hand twist extending in both directions from central points, *b'*, to the points, *a*, at each side thereof, but the twist may be continuous.

It will be noticed by reference to Fig. 2 that while the adjacent loops cross at the end, one strand of each loop passing laterally to constitute the next loop, yet the bodies or main portions of the loops are laterally distinct and do not substantially cross each other. This is a very desirable construction, in that it renders the fencing easy to make, and tends to produce an ornamental appearance; and it is claimed specifically herein, although other claims are not limited thereto.

The advantages of my invention will be appreciated by those skilled in the art.

I claim—

1. Fencing composed of a continuous line of wire arranged in vertical loops, of parallel branches crossing at the end, the main portions of the adjacent loops being laterally distinct from each other, as set forth.

2. Fencing composed of a continuous line of wire arranged in vertical loops crossing at the end, the main portions of the adjacent loops being laterally distinct from each other, parts of the different loops being parallel and the several loops having their branches touching or approaching at intervals between the ends of the loops, as set forth.

3. Fencing composed of a continuous line of wire arranged in vertical loops crossing at the end, and having their branches touching or approaching at intervals between the ends of the loops, and longitudinal strands connecting the branches of the loops; substantially as described.

4. Fencing composed of a continuous line of wire arranged in vertical loops crossing at the end, and having their branches touching or approaching at intervals between the ends of the loops, and longitudinal strands connecting the branches of the loops and twisted in opposite directions between the points of crossing of the loop; substantially as described.

In testimony whereof I affix my signature in presence of two witnesses.

GEORGE LEHBERGER.

Witnesses:
W. A. KILMER,
C. A. MCCREADY.